United States Patent [19]

Buechele

[11] Patent Number: 5,697,156

[45] Date of Patent: Dec. 16, 1997

[54] METHOD OF MAKING A BACKING STRIP FOR EXTRUDED WINDSHIELD WIPER SQUEEGEE

[75] Inventor: Franz Buechele, Lawrenceburg, Tenn.

[73] Assignee: ACD Tridon Inc., Burlington, Canada

[21] Appl. No.: 694,822

[22] Filed: Aug. 9, 1996

[51] Int. Cl.[6] ............................................. B60S 1/38
[52] U.S. Cl. .................... 29/897.2; 29/558; 15/240.451; 15/250.452
[58] Field of Search ................. 15/250.361, 250.43, 15/250.44, 250.451, 250.452, 250.453, 250.48, 250.454; 29/558, 897.2

[56] References Cited

U.S. PATENT DOCUMENTS

| 3,018,500 | 1/1962 | Anderson | 15/250.453 |
|---|---|---|---|
| 3,076,993 | 2/1963 | Anderson | 15/250.451 |
| 3,117,336 | 1/1964 | Reese | 15/250.452 |
| 3,141,186 | 7/1964 | Scinta | 15/250.452 |
| 3,386,123 | 6/1968 | Oishei et al. | 15/250.452 |
| 3,616,485 | 11/1971 | Quinlan et al. | 15/250.454 |
| 3,659,310 | 5/1972 | Rosen | 15/250.452 |
| 4,264,998 | 5/1981 | Stratton | 15/250.453 |
| 4,782,549 | 11/1988 | Beneteau et al. | 15/250.452 |
| 4,796,326 | 1/1989 | Beneteau et al. | 15/250.452 |
| 5,023,972 | 6/1991 | Bauer et al. | 15/250.453 |
| 5,231,730 | 8/1993 | Schmid et al. | 15/250.452 |

FOREIGN PATENT DOCUMENTS

| 007017 A1 | 6/1979 | European Pat. Off. . | |
| 158070 B1 | 2/1985 | European Pat. Off. . | |
| 667266 A1 | 8/1995 | European Pat. Off. . | |
| 739795 | 10/1996 | European Pat. Off. . | |
| 32 08 749 A1 | 3/1982 | Germany . | |
| 901282 | 7/1962 | United Kingdom . | |
| 2191083 | 12/1987 | United Kingdom . | |
| 2227406 | 8/1990 | United Kingdom | 15/250.453 |
| 2239589 | 7/1991 | United Kingdom . | |
| 2243991 | 11/1991 | United Kingdom . | |
| 2245482 | 1/1992 | United Kingdom . | |
| 2292672 | 3/1996 | United Kingdom . | |

Primary Examiner—Gary K. Graham
Attorney, Agent, or Firm—Bacon & Thomas

[57] ABSTRACT

A rail forming part of a backing strip for a windshield wiper squeegee is formed from a blank comprising a flat metal strip of narrow width which is formed with an offset portion that extends transversely on a longitudinally axis of the strip so as to protrude on one side, a claw retention slot being edge-punched from the offset portion and a pair of rubber squeegee-retaining barb elements being formed opposite from the offset portion so as to retain the squeegee to the backing strip.

5 Claims, 2 Drawing Sheets a b c d e

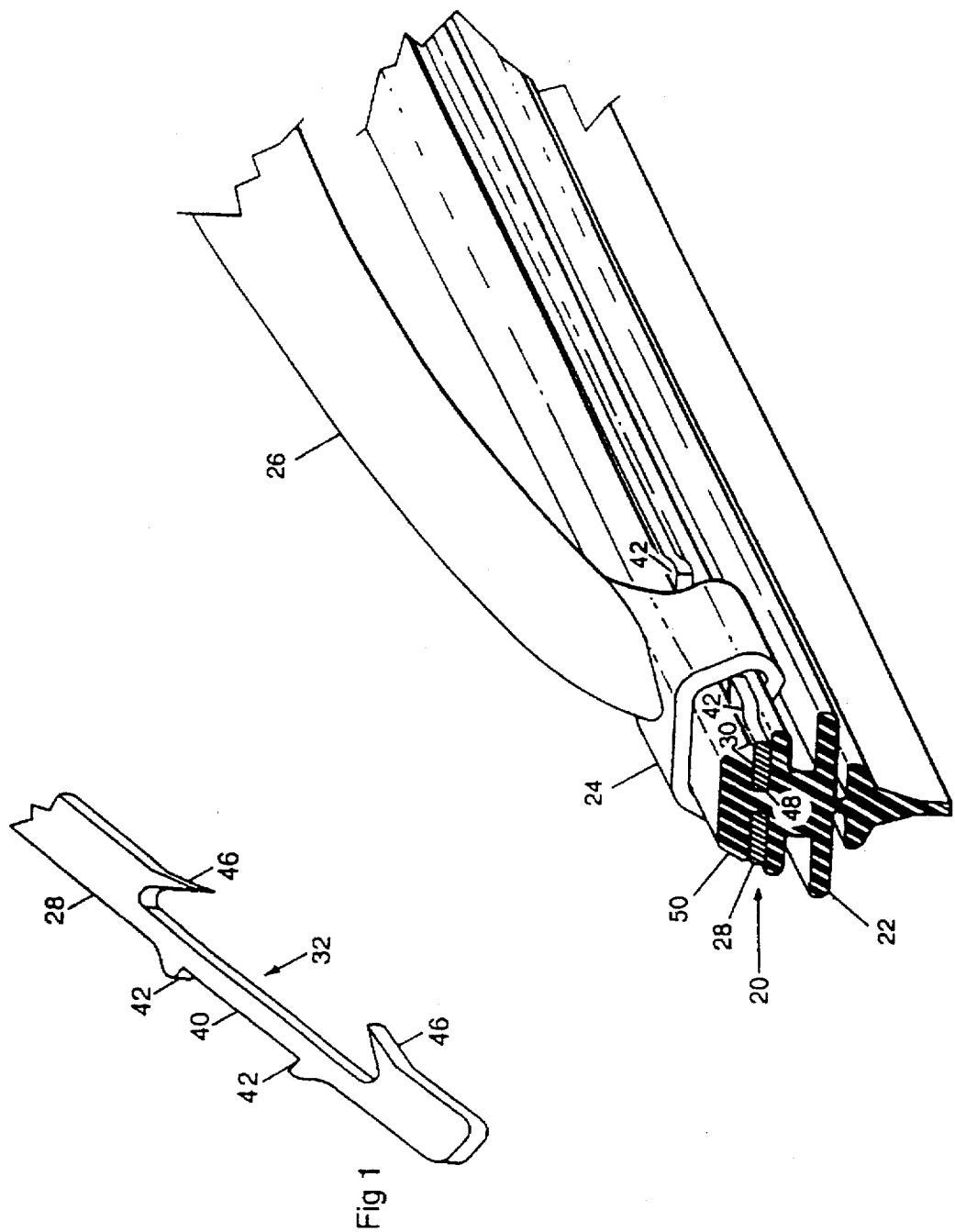

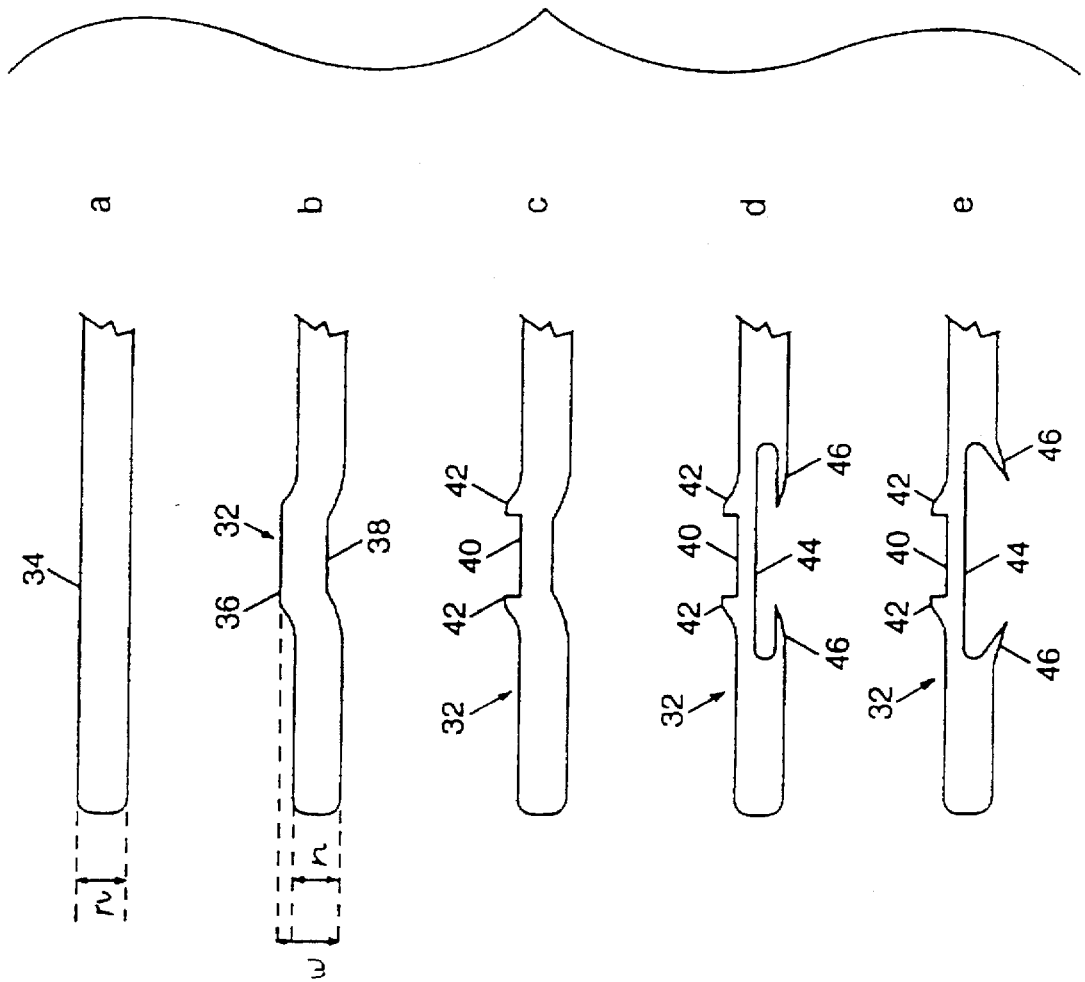

METHOD OF MAKING A BACKING STRIP FOR EXTRUDED WINDSHIELD WIPER SQUEEGEE

FIELD OF THE INVENTION

This invention relates to a backing strip, also known as a vertebra or spine, and used in association with a rubber squeegee in windshield wiper assemblies to stiffen the squeegee and to provide mounting attachments for coupling the squeegee to the wiper superstructure.

BACKGROUND OF THE INVENTION

One form of backing strip comprises a flat metal strip having a central longitudinal slot dividing the strip into a pair of rails and into which the reduced diameter neck portion of a molded rubber squeegee is positioned with the retention bead of the squeegee lying between the backing strip and the wiper superstructure. The rails may be joined at the ends of the strip if the slot is made to extend slightly less than the full length of the backing strip or the rails may be separate and coupled at the ends of the backing strip by means of a clip. In the former case, the squeegee itself has usually been fabricated with location means during a molding process whereas, in the latter, the squeegee may be fabricated by extrusion which is less costly.

Some backing strip structures comprising rail pairs have been proposed in which at least one rail is formed with a barb portion for penetrating the squeegee and to thereby prevent relative longitudinal movement between the backing strip and the squeegee and obviate the need to use a clip. Examples of such structures may be found in GB 2,243,991 and DE 3,208,749.

In both of these patents, the barb is longitudinally spaced from an abutment or notch-like structure which cooperates with a claw in the end yoke of a wiper superstructure to attach to the spine.

It will be understood that maximum stress is applied to the squeegee through the yokes of the superstructure where they are attached to each other, namely at the claws, and therefore that it is desirable to minimize said spacing between a barb and a notch.

It is also desirable to secure only one end of the squeegee so that the remainder of the squeegee can slide relative to the retaining structure and thereby adapt to the changing surface of a windshield, particularly in modern automobiles where the squeegee must wrap on a windshield having a pronounced curvature.

An object of this invention is to provide a method of fabricating such a spine structure which is economical and easy and to provide a structure for a backing strip which will reliably couple the squeegee to the windshield wiper superstructure by minimizing the longitudinal separation between a barb and a notch.

SUMMARY OF THE INVENTION

In accordance with this invention, there is provided a method of fabricating a rail forming part of a backing strip for a windshield wiper squeegee from a blank comprising a flat metal strip of narrow width, the strip having a longitudinal axis, and the method including the following steps:

forming an offset portion of predetermined length on an intermediate portion of the strip, the offset portion extending transversely on said longitudinal axis so as to protrude from the remainder of the strip on one side thereof, a hollow being formed on the opposite side thereof;

edge-punching said offset portion to form an abutment adapted to locate a claw forming part of a windshield wiper superstructure;

cutting an opening in said intermediate portion adjacent to said hollow to form at least one barb element of reduced cross-sectional width; and pulling said at least one barb element outwardly in a direction transverse to said longitudinal axis so as to protrude outwardly from the strip.

BRIEF DESCRIPTION OF THE DRAWINGS

In order that the invention may be more clearly understood, a preferred embodiment is described below with reference to the accompanying drawings, in which:

FIG. 1 is a perspective view of a portion of a rail forming part of a backing strip and made in accordance with the invention;

FIG. 2 is a perspective view of a portion of a windshield wiper assembly showing a cross-sectional view through a squeegee and backing strip made in accordance with the invention; and FIGS. 3 a–e are schematic top elevation views of a portion of a rail forming part of a backing strip, and showing process steps for fabricating a backing strip in accordance with the invention.

DESCRIPTION OF PREFERRED EMBODIMENT

A backing strip made in accordance with the invention is generally designated by numeral 20 in FIG. 2 of the drawings. The backing strip 20 which is also known as a vertebra or spine is associated with a rubber squeegee 22 in a windshield wiper assembly and is used to stiffen the squeegee throughout its length while allowing the squeegee to flex in an orthogonal direction to the length of the squeegee so that it can conform to the surface of a curved windshield. The backing strip 20 is attached to a windshield wiper superstructure by means of a claw termination 24 on a yoke 26 forming part of a wiper superstructure.

In accordance with the invention, the backing strip 20 comprises a pair of congruent rails 28, 30 of which one is shown in greater detail in FIG. 1. Each rail is fabricated from a blank comprising a flat metal strip of narrow width and would typically be formed by rolling stainless steel wire having a selected diameter. The strip formed by rolling the wire will typically have a width of 25 mm and a thickness of 8 mm. The strip itself may be of indefinite length or cut to predetermined lengths commensurate with the size of the windshield wiper superstructure with which the backing strip is intended to be used.

An intermediate portion 32 of the strip adjacent one end of the strip is shaped to receive the claw termination 24 and has retention means for securing the rail to the squeegee 22.

The processing sequence for shaping the rail is shown in FIG. 3 of which FIG. 3a shows a blank 34 comprising the above-mentioned flat metal strip. The blank 34 is formed with an offset portion 36 extending transversely from a longitudinal axis defined by the length of the strip so as to protrude from the remainder of the strip on one side, a hollow 38 being formed on the opposite side of the strip during such deformation. The position of the offset portion is selected to be adjacent one end of the strip and spaced from the end by a distance commensurate with the claw position in the intended superstructure. This step is shown in FIG. 3b.

The offset portion 36 is edge-punched to form an open slot 40 defined by a pair of longitudinally-spaced abutments 42 and adapted to locate a claw, such as the claw termination 24, therebetween. This step is shown in FIG. 3c.

On the opposite side of the slot 40, a longitudinally extending opening 44 is cut from the intermediate portion 32 adjacent to the hollow 38 so as to form a pair of barb elements 46 of reduced cross-sectional width. This step is shown in FIG. 3d. It will be seen that the open slot 40 is disposed on the opposite side of the rail between the barb elements 46.

In a final step, shown in FIG. 3e, the barb elements 46 are pulled outwardly in a direction transverse to the aforementioned longitudinal axis so as to protrude outwardly from the strip or rail. If the strip is of indefinite length, it would also be trimmed to the required length to match the intended wiper superstructure.

It will be appreciated that the processing sequence, in accordance with the method of the invention, allows a slot 40 to be cut after deformation of the blank 34 and therefore there is no wasted material which must be discarded or recycled. The deformation also selectively increases the effective width of the strip indicated by "w" in FIG. 3b so that it exceeds the nominal width of the blank indicated by "n" in FIG. 3a. The increased width in the intermediate portion 32 accommodates both the open slot 40 and the opening 44 to form the barb elements 46 so that they can be formed on opposite sides of the rail.

The resulting configuration is most desirable since any stresses applied through the claw termination 24 to the squeegee 22 will result in a more positive retention of the squeegee through the barb elements 46. The barb elements 46 have pointed terminations which will penetrate the rubber material of the squeegee 22 upon the application of forces distributed throughout the windshield wiper superstructure and transmitted to the squeegee at the claw termination 24.

Conveniently, the method, in accordance with the invention, permits the barb elements to be disposed in the immediate vicinity of the opening for receiving the claw termination without waste of material and without unduly increasing the width of the strip to exceed accepted standards in the industry which could otherwise necessitate changes in the fabrication of both the squeegee and the wiper superstructure.

In use, it will be understood that the rails 28, 30 are each disposed on opposite sides of the squeegee 22 in respective longitudinal grooves which define a reduced diameter neck portion 48 in the squeegee with a retention bead 50 of the squeegee lying between the rails 28, 30 and the wiper superstructure. The rails 28, 30 are oriented so that their respective slots 40 open outwardly to receive and locate respective ends of claw terminations of the wiper superstructure 24 while the barb elements 46 are oriented so as to penetrate the reduced diameter neck portion 48 of the squeegee 22.

It will be understood that several variations may be made to the above-described preferred embodiment of the invention within the scope of the appended claims. In particular, it will be understood that any suitably shaped abutments may be used to locate the claw termination 24 and that the shape and configuration of the slot 40 illustrated is only exemplary. Similarly, the number of barb elements 46 and the shape of the associated opening 44 made to form the barb elements may vary, as will be apparent to those skilled in the art.

I claim:

1. A method of fabricating a rail forming part of a backing strip for a windshield wiper squeegee from a blank comprising a flat metal strip of narrow width, the flat metal strip defining a longitudinal axis, the method including the following steps:

forming an elongated offset portion of predetermined length on an intermediate portion of the flat metal strip, the offset portion being shifted transversely to said longitudinal axis so as to protrude from the remainder of the flat metal strip on one side thereof, said offset portion creating a hollow being formed on an opposite side thereof;

edge-punching said offset portion to form an abutment adapted to locate a claw forming part of a windshield wiper superstructure;

cutting at least one opening in said intermediate portion at said hollow to form at least one barb element of reduced cross-sectional width; and pulling said at least one barb element outwardly in a direction transverse to said longitudinal axis so as to protrude outwardly from the flat metal strip.

2. Method according to claim 1 in which the flat metal strip is pre-cut to a desired length prior to formation of the offset portion and the offset portion is formed adjacent one end of the flat metal strip at a predetermined distance from the end of the flat metal strip commensurate with the relative position of a claw in a selected windshield wiper superstructure.

3. Method according to claim 1 in which the offset portion is edge-punched to form a pair of abutments defining an open slot.

4. Method according to claim 1 in which a pair of oppositely directed barb elements are cut from said intermediate portion.

5. Method according to claim 4 in which the barb elements are longitudinally spaced from each other and the offset portion is edge-punched to form a pair of abutments defining an open slot, the open slot being disposed on the opposite side of the flat metal strip rail between the barb elements.

* * * * *